(12) United States Patent
De la Torre et al.

(10) Patent No.: US 10,573,349 B2
(45) Date of Patent: Feb. 25, 2020

(54) SYSTEMS AND METHODS FOR GENERATING PERSONALIZED EMOTICONS AND LIP SYNCHING VIDEOS BASED ON FACIAL RECOGNITION

(71) Applicant: Facebook, Inc., Menlo Park, CA (US)

(72) Inventors: Fernando De la Torre, Menlo Park, CA (US); Dong Huang, Pittsburgh, PA (US); Francisco Vicente Carrasco, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/857,098

(22) Filed: Dec. 28, 2017

(65) Prior Publication Data
US 2019/0206441 A1 Jul. 4, 2019

(51) Int. Cl.
| | | |
|---|---|---|
| G11B 27/036 | (2006.01) | |
| G06T 7/40 | (2017.01) | |
| G06K 9/00 | (2006.01) | |
| G06K 9/62 | (2006.01) | |
| G06T 7/73 | (2017.01) | |

(52) U.S. Cl.
CPC ........ G11B 27/036 (2013.01); G06K 9/00228 (2013.01); G06K 9/00281 (2013.01); G06K 9/00308 (2013.01); G06K 9/00315 (2013.01); G06K 9/6202 (2013.01); G06K 9/6215 (2013.01); G06T 7/40 (2013.01); G06T 7/74 (2017.01); *G06T 2207/30201* (2013.01)

(58) Field of Classification Search
CPC .................... G11B 27/036; G06T 7/74; G06T 2207/30201; G06K 9/00228; G06K 9/00315; G06K 9/6202; G06K 9/6215
See application file for complete search history.

(56) References Cited

U.S. PATENT DOCUMENTS

| 8,009,966 B2* | 8/2011 | Bloom ................. G11B 27/034 386/285 |
| 8,705,813 B2* | 4/2014 | Matsuyama ....... G06K 9/00295 348/169 |

(Continued)

FOREIGN PATENT DOCUMENTS

JP 2016170542 9/2016

OTHER PUBLICATIONS

International Application PCT/US2018/012112, International Search Report and Written Opinion dated Sep. 27, 2018.

*Primary Examiner* — Thai Q Tran
*Assistant Examiner* — Jose M Mesa
(74) *Attorney, Agent, or Firm* — Sheppard Mullin Richter & Hampton LLP

(57) ABSTRACT

Systems, methods, and non-transitory computer readable media can obtain a first image of a first user depicting a face of the first user with a neutral expression or position. A first image of a second user depicting a face of the second user with a neutral expression or position can be identified, wherein the face of the second user is similar to the face of the first user based on satisfaction of a threshold value. A second image of the first user depicting the face of the first user with an expression different from the neutral expression or position can be generated based on a second image of the second user depicting the face of the second user with an expression or position different from the neutral expression or position.

17 Claims, 9 Drawing Sheets

(56) References Cited

U.S. PATENT DOCUMENTS

| | | | | |
|---|---|---|---|---|
| 8,848,068 B2* | 9/2014 | Pfister | ................ | G06K 9/00315 |
| | | | | 348/222.1 |
| 9,532,004 B1* | 12/2016 | Metter | ................ | H04L 65/1096 |
| 9,576,175 B2* | 2/2017 | Chembula | ................ | G06K 9/00 |
| 9,799,140 B2* | 10/2017 | Hwang | .............. | G06K 9/00281 |
| 2004/0120554 A1 | 6/2004 | Lin | | |
| 2011/0069879 A1 | 3/2011 | Hwang | | |
| 2012/0005595 A1 | 1/2012 | Gavade | | |
| 2013/0242031 A1 | 9/2013 | Petterson | | |
| 2016/0267339 A1 | 9/2016 | Nakano | | |
| 2017/0069124 A1 | 3/2017 | Tong | | |

* cited by examiner

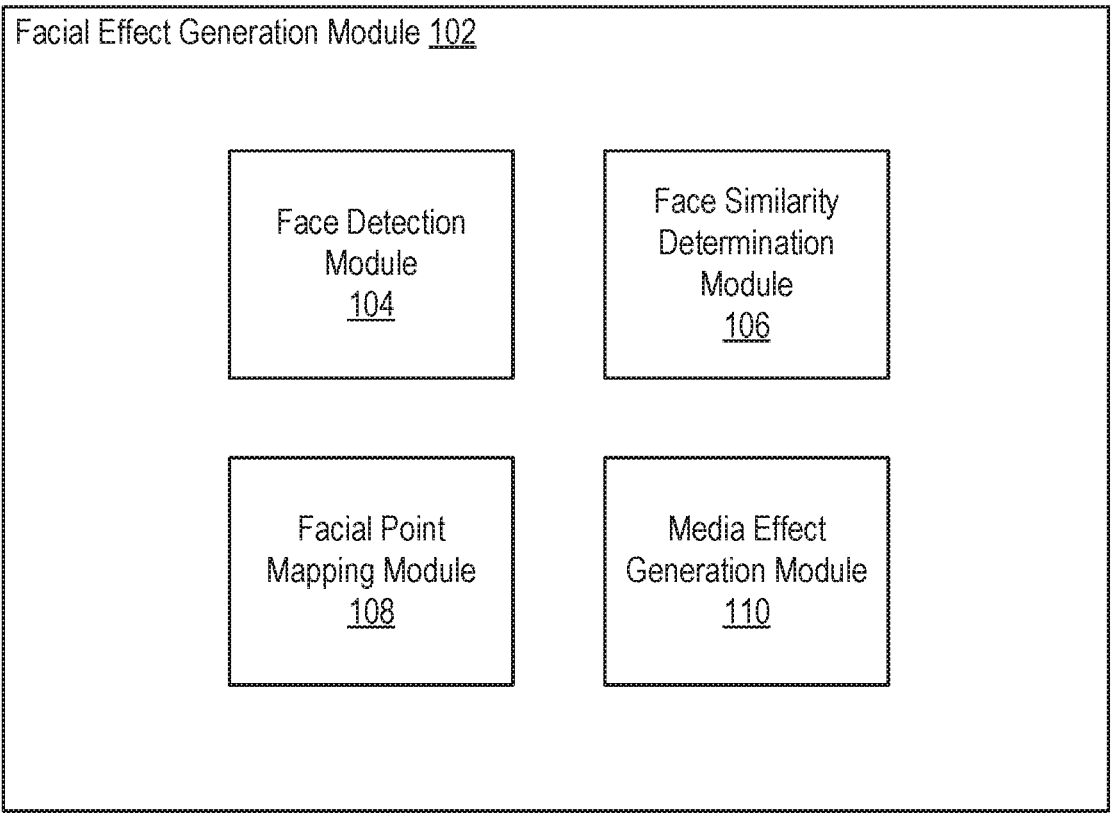
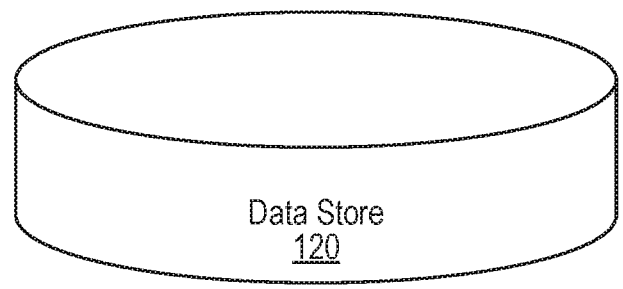
FIGURE 1

400

Obtain a first image of a first user depicting a face of the first user with a neutral expression or position
402

Identify a first image of a second user depicting a face of the second user with a neutral expression or position, wherein the face of the second user is similar to the face of the first user based on satisfaction of a threshold value
404

Generate a second image of the first user depicting the face of the first user with an expression different from the neutral expression or position, based on a second image of the second user depicting the face of the second user with an expression or position different from the neutral expression or position
406

FIGURE 4

500
Obtain a first image of a user depicting a face of the user with a particular expression
502
Determine key points of the particular expression
504
Amplify the key points of the particular expression
506
Generate a second image of the user depicting the face of the user with an amplified version of the particular expression, based on the amplified key points
508
FIGURE 5

SYSTEMS AND METHODS FOR GENERATING PERSONALIZED EMOTICONS AND LIP SYNCHING VIDEOS BASED ON FACIAL RECOGNITION

FIELD OF THE INVENTION

The present technology relates to the field of social networks. More particularly, the present technology relates to techniques for generating various media effects based on facial recognition.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system. In some embodiments, facial recognition can be performed in connection with content items.

SUMMARY

Various embodiments of the present disclosure can include systems, methods, and non-transitory computer readable media configured to obtain a first image of a first user depicting a face of the first user with a neutral expression or position. A first image of a second user depicting a face of the second user with a neutral expression or position can be identified, wherein the face of the second user is similar to the face of the first user based on satisfaction of a threshold value. A second image of the first user depicting the face of the first user with an expression different from the neutral expression or position can be generated based on a second image of the second user depicting the face of the second user with an expression or position different from the neutral expression or position.

In some embodiments, the identifying the first image of the second user includes comparing facial points of the first user in the first image of the first user and facial points of the second user in the first image of the second user, wherein a degree of a match between the facial points of the first user and the facial points of the second user satisfies the threshold value.

In certain embodiments, the generating the second image of the first user includes mapping the facial points of the first user in the first image of the first user to the facial points of the second user in the second image of the second user.

In an embodiment, a personalized emoticon for the first user is generated based on the second image of the first user.

In some embodiments, the first image of the second user is included in a video of the second user singing a song, and a lip synching video of the first user is generated based on the second image of the first user.

In certain embodiments, the identifying the first image of the second user includes comparing a texture of at least a region in the first image of the first user and a texture of a corresponding region in in the first image of the second user, wherein a degree of a match between the texture of the at least a region in the first image of the first user and the texture of the at least a region in the first image of the second user satisfies a threshold value.

In an embodiment, a portion of the at least a region in the first image of the second user is copied to generate the second image of the first user.

In some embodiments, the comparing the texture of the at least a region in the first image of the first user and the texture of the corresponding region in in the first image of the second user includes determining texture features of the at least a region in the first image of the first user and texture features of the at least a region in the first image of the second user.

In certain embodiments, an image is represented as a matrix of values, and texture features of the image includes one or more of: an average of the values or a median of the values.

In an embodiment, the expression different from the neutral expression includes one or more of: a happy expression, a sad expression, an angry expression, a surprise expression, a crying expression, a smiling expression, a laughing expression, or a frowning expression.

Various embodiments of the present disclosure can include systems, methods, and non-transitory computer readable media configured to obtain a first image of a user depicting a face of the user with a particular expression. Key points of the particular expression can be determined. The key points of the particular expression can be amplified. A second image of the user depicting the face of the user with an amplified version of the particular expression can be generated based on the amplified key points.

In some embodiments, the particular expression includes one or more of: a happy expression, a sad expression, an angry expression, a surprise expression, a crying expression, a smiling expression, a laughing expression, or a frowning expression.

In certain embodiments, the face of the user is represented by a plurality of facial points, and the key points of the particular expression are a subset of the facial points.

In an embodiment, the plurality of facial points is identified based on face detection.

In some embodiments, the amplifying the key points of the particular expression includes moving one or more of the key points of the particular expression.

In certain embodiments, the one or more of the key points of the particular expression move by respective selected distances.

In an embodiment, the respective selected distances are different distances.

In some embodiments, one or more of the key points do not move.

In certain embodiments, the amplified version of the particular expression depicts an increased magnitude of the particular expression.

In an embodiment, the particular expression is associated with key points in a particular position characteristic of the particular expression.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 1 illustrates an example system including an example facial effect generation module configured to provide various media effects based on facial recognition, according to an embodiment of the present disclosure.

FIG. 4 illustrates an example first method for providing various media effects based on facial recognition, according to an embodiment of the present disclosure.

FIG. 5 illustrates an example second method for providing various media effects based on facial recognition, according to an embodiment of the present disclosure.

Figure 2:
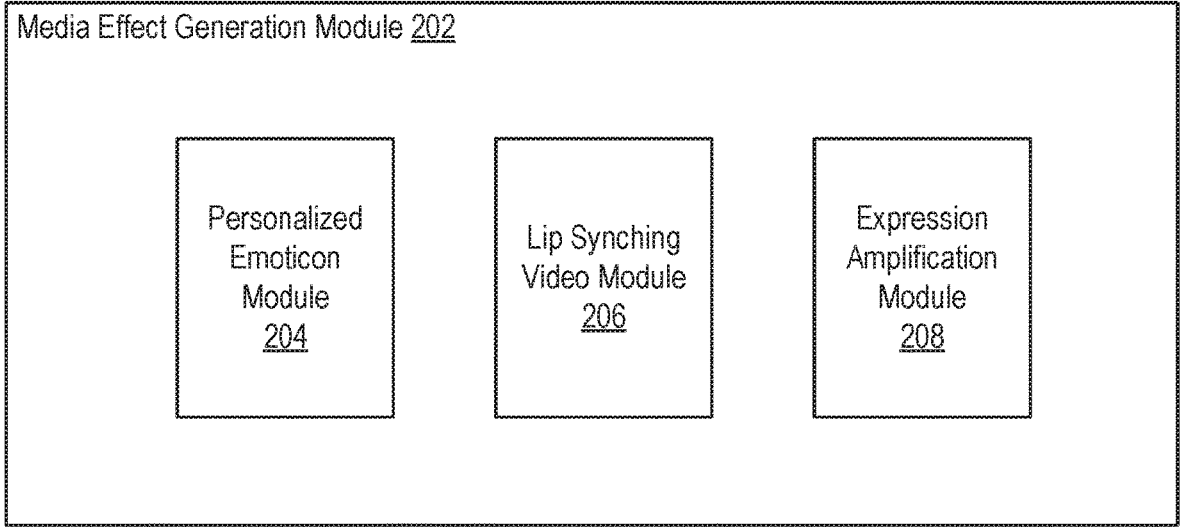
FIG. 2 illustrates an example media effect generation module configured to generate various media effects based on facial recognition, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Media Effect Generation Based on Facial Recognition Techniques

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide resources through which users may publish content items. In one example, a content item can be presented on a profile page of a user. As another example, a content item can be presented through a feed for a user to access.

Under conventional approaches specifically arising in the realm of computer technology, facial recognition may be performed in connection with content items associated with a social networking system. As an example, connections of a user in a photo can be identified based on facial recognition, and the user may tag one or more identified connections. However, conventional approaches may not provide personalized media effects, or only provide limited personalized media effects, based on facial recognition of users. For instance, conventional approaches may not provide personalized media effects that are generated for a particular user, for example, based on facial features of the user.

An improved approach rooted in computer technology can overcome the foregoing and other disadvantages associated with conventional approaches specifically arising in the realm of computer technology. Based on computer technology, the disclosed technology can provide various media effects for users based on facial recognition. As an example, the disclosed technology can provide personalized emoticons for users. For a particular user, an image depicting the face of the user with a neutral expression can be matched to an image depicting the face of another user with a neutral expression. There can be images depicting the face of the other user with different expressions. Examples of different expressions can include happy, sad, angry, etc. The image depicting the face of the user with the neutral expression can be mapped to images depicting the face of the other user with different expressions in order to create personalized emoticons of the user depicting different expressions. As another example, the disclosed technology can provide lip synching videos for users. For a particular user, an image depicting the face of the user in a neutral position can be matched to an image depicting the face of another user in a neutral position that is included in a video of the other user singing a song. The image depicting the face of the user in the neutral position can be mapped to the video depicting the face of the other user singing the song in order to create a personalized lip synching video of the user singing the song. As a further example, the disclosed technology can provide amplified expressions for users. For a particular user, an image depicting the user with a particular expression can be obtained. Examples of expressions can include happy, sad, angry, etc. Key points of the expression can be extracted and amplified in order to increase a magnitude or extent of the expression. In this manner, the disclosed technology can provide personalized media effects for users, which can make the experience of generating content items associated with a social networking system more interesting. Additional details relating to the disclosed technology are provided below.

FIG. 1 illustrates an example system 100 including an example facial effect generation module 102 configured to provide various media effects based on facial recognition, according to an embodiment of the present disclosure. The facial effect generation module 102 can include a face detection module 104, a face similarity identification module 106, a facial point mapping module 108, and a media effect generation module 110. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the facial effect generation module 102 can be implemented in any suitable combinations. While the disclosed technology is described in connection with facial recognition-based media effects associated with a social networking system for illustrative purposes, the disclosed technology can apply to any other type of system and/or content.

The face detection module 104 can detect a face in an image. For example, the face detection module 104 can detect facial points of a face in an image. Facial points can also be referred to as "facial landmarks." Facial points relate to image data corresponding to anatomical points on a human face that can be automatically detected in a consistent way for different people under various conditions, such as lighting conditions, orientations, etc. For example, facial points may indicate locations of certain prominent points of lips, eyes, nose, eyebrows, chin, forehead, ears, or other facial features. Specific locations of facial points can vary depending on a particular person and can be expressed, for instance, using a selected coordinate system based on dimensions of an image in which the facial points are depicted or subject matter depicted in the image, to name some examples. In some embodiments, faces detected by the face detection module 104 in images may exhibit various expressions. Examples of expressions or facial expressions can include happy, sad, angry, surprise, crying, smiling, laughing, frowning, etc. In some instances, a face in an image may not exhibit any expression and can be in a resting state. Such a lack of expression can be referred to as a "neutral expression." In certain embodiments, faces detected by the face detection module 104 that are engaged in movement or speaking may be associated with facial points in various positions associated with the movement or speaking. For example, a face in an image may speak a particular syllable or word. In some instances, a face in an image and corresponding facial points may be in a position without any movement or speaking, or resting state. Such a position can be referred to as a "neutral position." Accordingly, the neutral expression and the neutral position can indicate the same state of a face being in a resting state. All examples herein are provided for illustrative purposes, and there can be many variations and other possibilities.

The face similarity identification module 106 can identify one or more faces that are similar to a face in an input image. For example, the face similarity identification module 106 can receive an input image depicting a face of a particular person and search through images of faces of other people to identify one or more faces that are similar to the face in the input image. The face in the input image and faces in other images can be detected by the face detection module 104 as described above. For example, facial points of the face in the input image and facial points of faces in other images can be determined by the face detection module 104. In some embodiments, the face similarity identification module 106 can search through images of faces depicting a same or similar expression as the face in the input image. For example, if the expression of the face in the input image is a neutral expression, then images of faces depicting a neutral expression can be identified. In certain embodiments, the face similarity identification module 106 can search through images of faces depicting a same or similar position of facial points as the face in the input image. For example, if the face in the input image is in a neutral position, then images of faces depicting neutral positions can be searched. As discussed herein, a face in an input image can be referred to as an "input face."

The face similarity identification module 106 can compare facial points of an input face and facial points of faces in other images in order to identify a face similar to the input face. As used herein, such a similar face is sometimes referred to as a "similar face of," "a similar face to," or "a similar face for" the input face. Two faces, or their corresponding facial points, may be considered similar or matching if locations of the respective facial points are the same or similar to a specified degree or extent. In some cases, a face that has facial points that are similar to facial points of the input face within a predetermined amount can be selected as a face that is similar to the input face. For example, a degree or extent of a match between the facial points of the selected similar face and the facial points of the input face can satisfy a threshold value. In some embodiments, the face similarity identification module 106 can determine a similarity metric indicative of a degree or extent of a match between the facial points of the input face and the facial points of another face. As an example, the similarity metric can be determined based on distances between the facial points of the input face and the facial points of another face. A face can be selected as the similar face of the input face if the similarity metric satisfies a threshold value. The similar face of the input face can be used to generate various media effects as described below. For instance, there can be images of the similar face depicting various expressions other than a neutral expression that can be used to create personalized emoticons for the input face. Or there can be a video of the similar face singing a song that can be used create a personalized lip synching video for the input face.

In some embodiments, the face similarity identification module 106 can take into consideration additional factors other than facial points in identifying a similar face for a face in an input image. An example of additional factors can include a texture of an input face. Textures of two images or regions of two images can be compared to determine whether the textures of the two images or the regions are similar. In certain embodiments, an image or region thereof can be represented as a matrix of values. In some cases, the matrix of values can be based on image data, such as pixel data. As an example, each value can be selected from a range of 0 to 255. In some embodiments, features relating to texture ("texture features") can be computed or extracted in order to compare textures of two images or regions of two images. Examples of texture features can include an average of values in an image or a region of an image, a median of values in an image or a region of an image, and other metrics. The face similarity identification module 106 can compare texture features of two images in order to identify a face that is similar to the input face. Textures of two images or regions of two images can be considered similar or to match if a comparison of values of texture features of the two images or the regions of the two images satisfy a threshold value. As an example, the comparison of values of texture features of the two images or the regions of the two images can include a difference between the values of the texture features. In some embodiments, the face similarity identification module 106 can determine a similarity metric indicative of a degree or extent of a match between the texture of an image, or a region of an image, relating to an input face and the texture of an image, or a region of an image, relating to another face. As an example, the similarity metric can be determined based on values of texture features of the input face and texture features of another face. The texture of the image, or a region of the image, of the input face and the texture of the image, or a region of the image, of another face can be considered to match if the similarity metric satisfies a threshold value. The face similarity identification module 106 can select a face that has similar facial points and a similar texture as an input face as a similar face of the input face. Consideration of texture can result in selection of a similar face that is optimally matched with an input face with respect to age, gender, ethnicity, and other factors that can influence facial appearance.

As explained above, the face similarity identification module 106 can identify a similar face for an input face based on facial points and/or additional factors, such as texture. In certain embodiments, the face similarity identification module 106 can select a similar face of an input face such that the similar face has similar facial points and a similar texture as the input face. The face similarity identification module 106 can use images of the similar face to fill in portions of the input face that are needed to generate other images of the input face. For instance, the face similarity identification module 106 can use an input image of a face depicting a neutral expression to generate images of the face depicting various expressions other than the neutral expression. Similarly, the face similarity identification module 106 can use an input image of a face depicting a neutral position to generate images of the face depicting facial points in various positions associated with movement or speaking. However, the input image of the face depicting the neutral expression may not show certain portions of the face needed to generate an image of the face exhibiting an expression other than the neutral expression. Or, the input image of the face exhibiting the neutral position may not show facial points in a position different from the neutral position. As an example, the input image of the face depicting the neutral expression may not show teeth, which may be needed to generate an image of the face depicting a smiling expression. In this example, the face similarity identification module 106 can select a similar face of the input face such that the similar face has a similar texture around the mouth region as the input face. The face similarity identification module 106 can use teeth of the similar face in an image of the similar face depicting a smiling expression in order to generate an image of the input face depicting a smiling expression. Because the texture of a relevant portion of a face is considered, the portion from the similar face can look more natural in the generated image of the input face. All examples herein are provided for illustrative purposes, and there can be many variations and other possibilities.

The facial point mapping module 108 can map an input face to a similar face of the input face. For instance, the similar face of the input face can be determined by the face similarity identification module 106, as described above. As an example, the facial point mapping module 108 can map facial points of the input face to facial points of the similar face exhibiting a different expression in order to generate an image of the input face exhibiting the different expression. For instance, a transformation mapping the facial points of the input face to the facial points of the similar face exhibiting the different expression can be determined and applied to the input face and its corresponding facial points. As another example, the facial point mapping module 108 can map facial points of the input face to facial points of the similar face exhibiting a different position in order to generate an image of the input face exhibiting the different position. For instance, a transformation mapping the facial points of the input face to the facial points of the similar face exhibiting the different position can be determined and applied to the input face and its corresponding facial points. In some embodiments, the facial point mapping module 108 can determine a transformation that maps facial points of an input face exhibiting a neutral expression or a neutral position to facial points of the similar face exhibiting a neutral expression or a neutral position, and also determine a transformation that maps facial points of the similar face exhibiting the neutral expression or the neutral position to facial points of the similar face exhibiting another expression or another position. Then, the facial point mapping module 108 can apply the determined transformations to the input face and its corresponding facial points so that the input face is transformed to exhibit the other expression or the other position depicted by the similar face. All examples herein are provided for illustrative purposes, and there can be many variations and other possibilities.

The media effect generation module 110 can generate various media effects based on facial recognition. For example, the media effect generation module 110 can create personalized emoticons, personalized lip synching videos, and amplified expressions. Functionality of the media effect generation module 110 is described in more detail herein.

In some embodiments, the facial effect generation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the facial effect generation module 102 can be, in part or in whole, implemented as software running on one or more computing devices or systems, such as on a server system or a client computing device. In some instances, the facial effect generation module 102 can be, in part or in whole, implemented within or configured to operate in conjunction or be integrated with a social networking system (or service), such as a social networking system 630 of FIG. 6. Likewise, in some instances, the facial effect generation module 102 can be, in part or in whole, implemented within or configured to operate in conjunction or be integrated with a client computing device, such as the user device 610 of FIG. 6. For example, the facial effect generation module 102 can be implemented as or within a dedicated application (e.g., app), a program, or an applet running on a user computing device or client computing system. The application incorporating or implementing instructions for performing functionality of the facial effect generation module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The data store 120 can be configured to store and maintain various types of data, such as the data relating to support of and operation of the facial effect generation module 102. The data maintained by the data store 120 can include, for example, information relating to facial recognition, media effects, personalized emoticons, personalized lip synching videos, amplified expressions, machine learning models, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the facial effect generation module 102 can be configured to communicate and/or operate with the data store 120. In some embodiments, the data store 120 can be a data store within a client computing device. In some embodiments, the data store 120 can be a data store of a server system in communication with the client computing device.

FIG. 2 illustrates an example media effect generation module 202 configured to generate various media effects based on facial recognition, according to an embodiment of the present disclosure. In some embodiments, the media effect generation module 110 of FIG. 1 can be implemented with the example media effect generation module 202. As shown in the example of FIG. 2, the example media effect generation module 202 can include a personalized emoticon module 204, a lip synching video module 206, and an expression amplification module 208.

The personalized emoticon module 204 can generate personalized emoticons for a particular user. The personalized emoticon module 204 can obtain an input image depicting the face of the user with a neutral expression. In some embodiments, the user can provide the input image. In other embodiments, facial recognition can be performed on images on a computing device of the user in order to identify the input image for the user. As an example, the input image for the user can be selected such that the user has a neutral expression, the user is front facing, and lighting conditions are satisfactory. The face of the user in the input image and/or other images can be detected by the face detection module 104, as described above.

The personalized emoticon module 204 can identify a similar face for the particular user based on the input image. For example, the similar face for the user can be identified by the face similarity identification module 106, as described above. Images of faces of other people can be searched to identify a similar face for the user. For instance, images of faces of various people can be stored in databases or storage devices. The faces of the other people can be detected by the face detection module 104, as described above. The similar face for the user can be identified by comparing the input image of the user depicting a neutral expression and images of faces of other people also depicting a neutral expression. The images of faces of the other people can also include images of the faces of the other people exhibiting various expressions other than the neutral expression. Examples of expressions can include happy, sad, angry, surprise, crying, smiling, laughing, frowning, etc.

The personalized emoticon module 204 can generate personalized emoticons for the particular user based on images of the similar face depicting different expressions. The similar face that is determined for the user can have associated images that depict the similar face with various expressions, such as happy, sad, angry, etc. Facial points of the user can be mapped to facial points of the similar face exhibiting an expression other than the neutral expression in order to generate a personalized emoticon for the user depicting that expression. The facial points of the user can be mapped to the facial points of the similar face by the facial point mapping module 108, as described above. As an example, there can be an image of the similar person depicting a smiling expression. Facial points of the user can be mapped, for example, directly, to facial points of the similar person exhibiting the smiling expression in order to generate a personalized emoticon for the user depicting the smiling expression. As another example, there can be an image of the similar person depicting a frowning expression. Facial points of the user can be mapped, for example, directly, to facial points of the similar person depicting the frowning expression in order to generate a personalized emoticon for the user depicting the frowning expression. In some embodiments, the personalized emoticon module 204 can generate a personalized emoticon for the particular user depicting a specific expression by determining a sequence of transformations. For instance, a transformation can be determined for mapping facial points of the user exhibiting the neutral expression to facial points of the similar face exhibiting the neutral expression. Also, a transformation can be determined for mapping facial points of the similar face exhibiting the neutral expression to facial points of the similar face exhibiting the specific expression. The transformations can be applied to the image of the user depicting the neutral expression to generate the personalized emoticon for the user depicting the specific expression. In this way, a personalized emoticon for the user can be generated for any expression that is depicted in an image of the similar face. In some embodiments, the personalized emoticon module 204 can generate personalized emoticons for a particular user based on machine learning techniques.

When a personalized emoticon is generated based on an image of a particular user depicting a neutral expression, one or more portions of the face of the user in the personalized emoticon may need to be filled in or copied from one or more images of the similar face. As an example, if the personalized emoticon exhibits a smiling expression, the image of the user depicting the neutral expression does not show teeth of the user. Accordingly, teeth of the similar face can be used to generate the personalized emoticon for the user depicting the smiling expression. As explained above, the similar face for a particular user can be determined such that the texture of the face or a portion of the similar face matches the face or a portion of the face of the user. Since the similar face and the face of the user have matching textures, a portion of the face of the user that is filled in from the similar face can look natural or smooth.

Generating personalized emoticons for a particular user by mapping facial points of the user to facial points of a similar face can advantageously facilitate generating expressions quickly as well as generalize expressions from a limited set of data. For example, personalized emoticons can be generated for many users from a limited set of images of a few similar faces depicting various expressions. On the other hand, generating personalized emoticons for a particular user based on certain machine learning techniques can require a large set of training data including images of a large number of people depicting different expressions. However, it may be difficult to obtain images of people depicting certain expressions, such as crying or sad, since people are less likely to capture images with these expressions.

In certain embodiments, the personalized emoticon module 204 can generate personalized emoticons for a particular user based on images of the user depicting various expressions. For example, the user can upload images of the user depicting different expressions, such as happy, sad, angry, etc. In these embodiments, the personalized emoticons for the user are generated directly from the images uploaded by the user, rather than mapping an image of the face of the user with a neutral expression to images of a similar face depicting various expressions.

The lip synching video module 206 can generate a personalized lip synching video for a particular user. For example, a lip synching video of a song can be generated for the user based on one or more videos of other people singing the song. A video of another person singing a song from which the lip synching video is generated can be referred to as a "driver video." For instance, videos of various people singing different songs may be stored in databases or storage devices. Similar to the personalized emoticon module 204, the lip synching video module 206 can obtain an input image depicting the face of the user in a neutral position. For example, facial points of the user in the input image may not exhibit any movement or speaking, and can be in a resting position. In some embodiments, the user can provide the input image. In other embodiments, facial recognition can be performed on images on a computing device of the user in order to identify the input image for the user. The face of the user in the input image and/or other images can be detected by the face detection module 104, as described above.

Similar to the personalized emoticon module 204, the lip synching video module 206 can identify a similar face for the particular user based on the input image. Videos of various people engaged in verbal expression, such as speaking or singing, can be maintained. A video of a person, for example, speaking or singing can include images or frames depicting facial points of the person in various positions. For example, a video of the person singing a song can include images or frames depicting facial points of the person in a neutral position. An image or frame depicting the person in a neutral position can be selected from the video as a reference image that can be compared with the input image of the user depicting a neutral position in order to identify a similar face for the user. For example, the similar face for the user can be identified by the face similarity identification module 106, as described above. The similar face for the user can be identified by comparing the input image of the user depicting a neutral position and reference images of faces of other people also depicting a neutral position.

The lip synching video module 206 can generate a personalized lip synching video of verbal expression, such as a song, for the particular user based on a video of a similar face for the user engaged in the verbal expression. For one or more images or frames of the video of the similar face, facial points of the user can be mapped to facial points of the similar face in order to generate a corresponding image or frame of the personalized lip synching video for the user. The facial points of the user can be mapped to the facial points of the similar face by the facial point mapping module 108, as described above. In some embodiments, the lip synching video module 206 can apply a sequence of transformations to generate a frame of the lip synching video for the user. For instance, a transformation can be determined for mapping facial points of the user exhibiting the neutral position to facial points of the similar face exhibiting the neutral position. Then, for a frame of the video of the similar face, a transformation can be determined for mapping the facial points of the similar face exhibiting the neutral position to facial points of the similar face exhibiting a specific position in the frame. For a frame of the video of the similar face, the transformations can be applied to the input image of the user depicting the neutral position to generate the corresponding frame of the lip synching video. In some embodiments, the lip synching video module 206 can generate a personalized lip synching video for a particular user based on machine learning techniques.

In certain embodiments, the lip synching video module 206 can initially generate a transformed or warped video of the similar face. For example, the transformation that maps the facial points of the user depicting the neutral position to the facial points of the similar face depicting the neutral position can be applied to one or more frames of the video of the similar face in order to generate the warped video. In this way, the facial points of the similar face can be re-positioned in the warped video to better correspond to the facial points of the user. In these embodiments, the lip synching video module 206 can then determine for a frame of the warped video a transformation that maps the facial points of the similar face in the neutral position to the facial points of the similar face in another position in the frame. The transformation for a frame of the warped video can be applied to the input image of the user in order to generate a frame of the lip synching video for the user.

As described above in connection with personalized emoticons, a similar face of the particular user can be determined such that the similar face has similar facial points and a similar texture as the face of the user. Portions of the face of the user that are missing from the input image can be filled in or copied from corresponding portions of the similar face. Since the similar face and the face of the user have matching textures, portions of the face of the user that are filled in from the similar face can look natural or smooth.

The expression amplification module 208 can generate amplified or exaggerated expressions for a particular user. The expression amplification module 208 can obtain an input image depicting the face of the user with a particular expression. In some embodiments, the input image may be from a video. Examples of expressions can include happy, sad, angry, surprise, crying, smiling, laughing, frowning, etc. The face of the user in the input image can be detected by the face detection module 104, as described above. A particular expression can be associated with key points in a particular position that are characteristic of the expression. For instance, key points of the expression can be a subset of facial points for the expression. Key points of the particular expression can be identified for the face of the user in the input image. The expression amplification module 208 can selectively modify or amplify the key points of the expression to generate an image of the user depicting an amplified version of the expression. For instance, the expression amplification module 208 can move one or more of the key points of the expression by a predetermined amount or distance and/or in a predetermined direction. One or more of the key points can move by different amounts or distances and/or in different directions. In some cases, some key points are not moved in generation of an amplified expression. In this way, the magnitude or extent of the expression can appear to be increased. As an example, if the expression is a smiling expression, the image of the user depicting an amplified version of the expression can show the user with an increased smile. As another example, if the expression is a frowning expression, the image of the user depicting an amplified version of the expression can show the user with an increased frown. Many variations are possible. In certain embodiments, the expression amplification module 208 can generate toned down expressions for a particular user. The expression amplification module 208 can selectively modify or tone down key points of an expression to generate an image of the user depicting a toned down or a reduced version of the expression. The magnitude or extent of the expression can appear to be decreased in the reduced version of the expression. As an example, if the expression is a smiling expression, the image of the user depicting a reduced version of the expression can show the user with a decreased smile. As another example, if the expression is a frowning expression, the image of the user depicting a reduced version of the expression can show the user with a decreased frown. In certain embodiments, the image of the user depicting an amplified version or a reduced version of the expression can be included in a video. In some embodiments, the image of the user depicting an amplified version or a reduced version of the expression can be generated based on machine learning techniques.

Figure 3A:
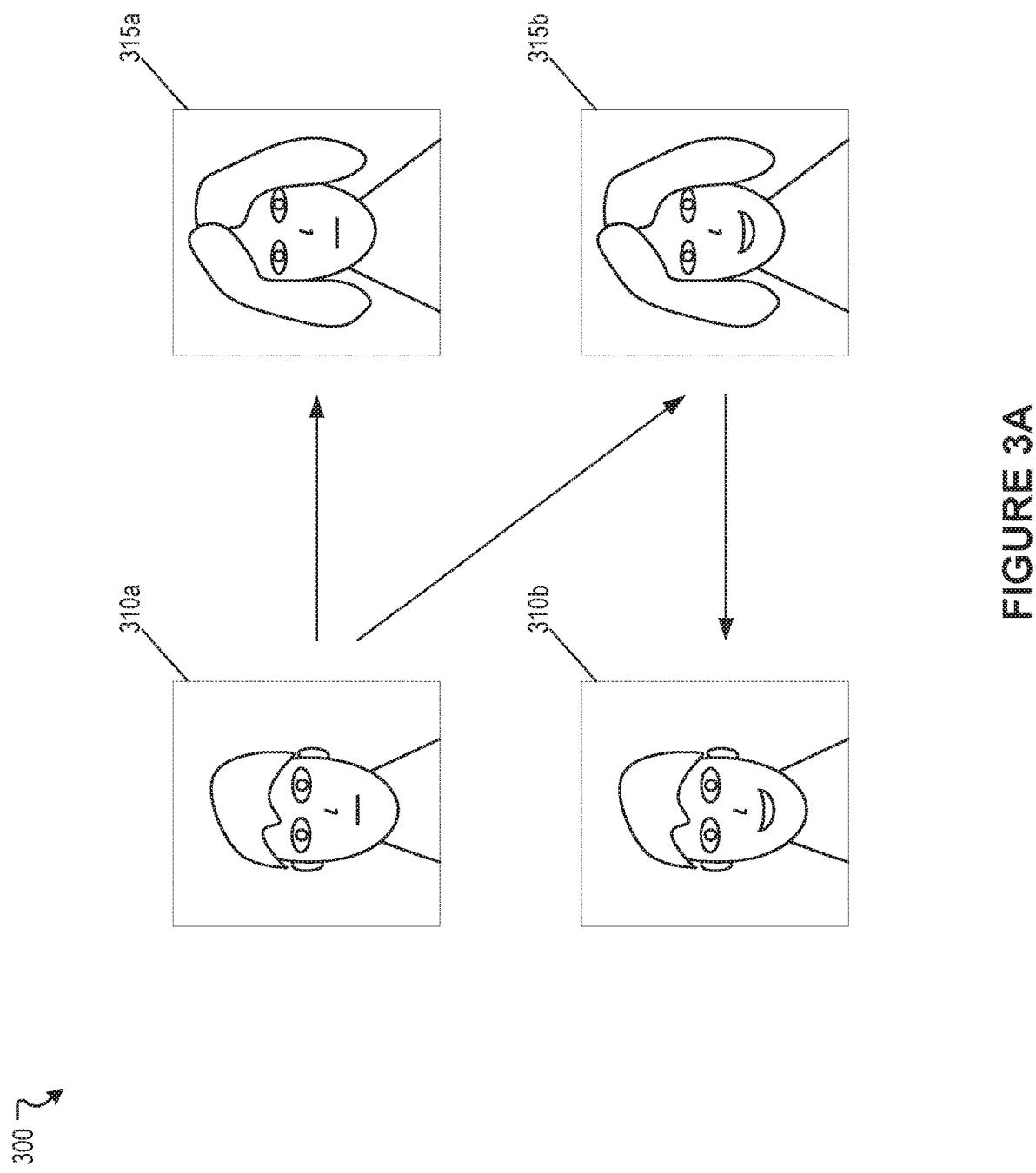
FIG. 3A illustrates an example scenario for providing personalized emoticons based on facial recognition, according to an embodiment of the present disclosure.

FIG. 3A illustrates an example scenario 300 for providing personalized emoticons based on facial recognition, according to an embodiment of the present disclosure. For example, personalized emoticons can be generated by the face recognition effect module 102, as discussed herein. In the example scenario 300, an input image 310a of a particular user depicting a neutral expression is obtained. Images of faces of other people depicting a neutral expression are searched to identify a similar face for the particular user. In the example scenario 300, an image 315a of a similar face for the user is identified through the search. Like the image 310a, the image 315a depicts the similar face exhibiting a neutral expression. There can be various images of the similar face depicting various other expressions. For example, an image 315b of the similar face depicts a smiling expression. Facial points of the particular user in the input image 310a can be mapped directly to facial points of the similar face in the image 315b in order to generate an image 310b of the particular user depicting the smiling expression. In some embodiments, a transformation mapping the facial points of the particular user in the input image 310a to facial points of the similar face in the image 315a can be determined, and a transformation mapping the facial points of the similar face in the image 315a to the facial points of the similar face in the image 315b can be determined. In these embodiments, the determined transformations can be applied to the input image 310a in order to generate the image 310b. Images of the particular user depicting other expressions can be generated in a similar manner. All examples herein are provided for illustrative purposes, and there can be many variations and other possibilities.

Figure 3B:
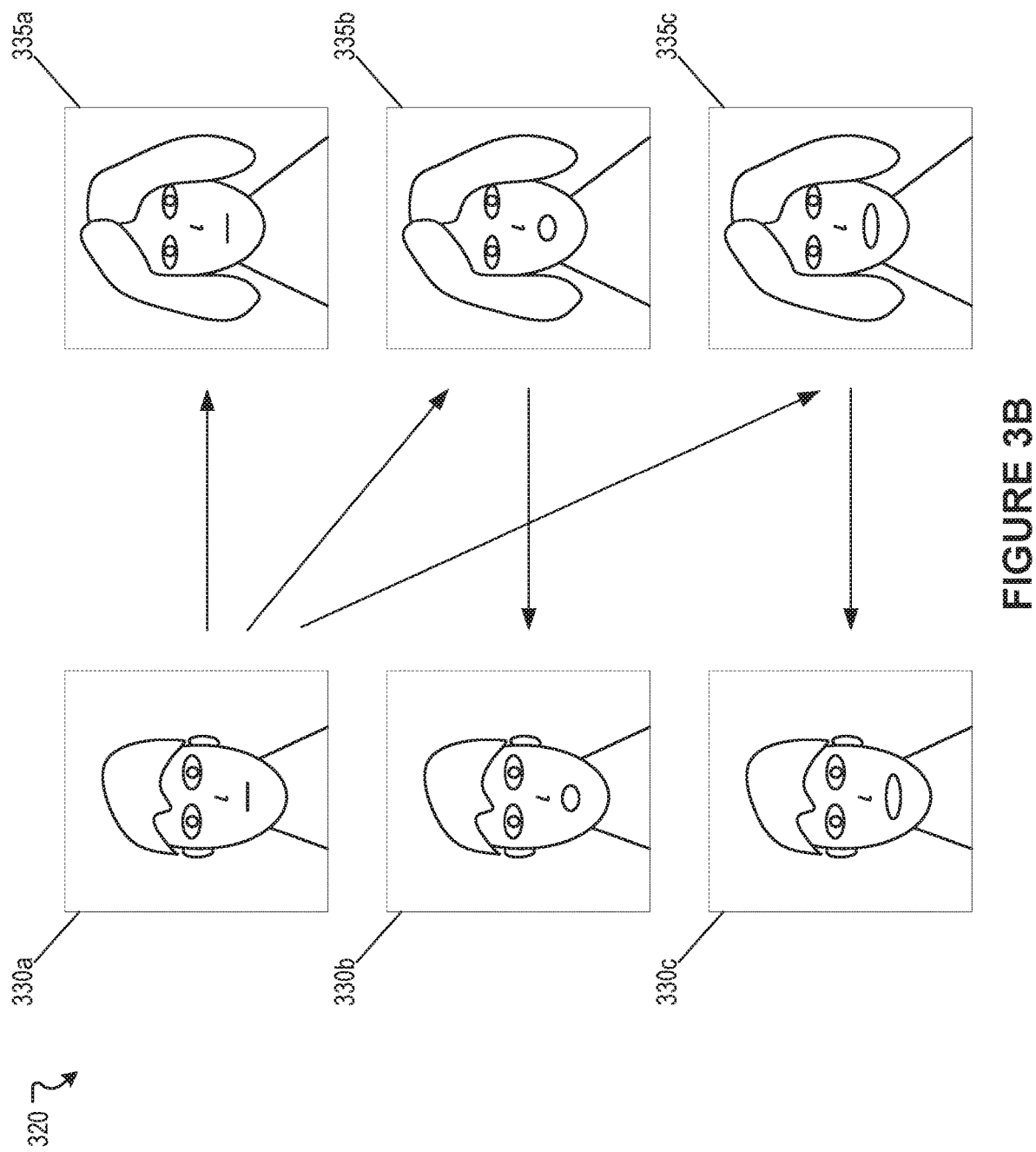
FIG. 3B illustrates an example scenario for providing lip synching videos based on facial recognition, according to an embodiment of the present disclosure.

FIG. 3B illustrates an example scenario 320 for providing lip synching videos based on facial recognition, according to an embodiment of the present disclosure. For example, lip synching videos can be generated by the face recognition effect module 102, as discussed herein. In the example scenario 320, an input image 330a of a particular user depicting a neutral position is obtained. There can be videos of various people, for example, singing a specific song. Images of such people that depict a neutral position can be obtained from the videos and searched to identify a similar face for the particular user. In the example scenario 320, an image 335a of a similar face for the user is identified. The video of the similar face singing the specific song can include multiple images or frames 335a-c. Each frame 335a-c can depict the similar face with facial points in different positions. Facial points of the particular user in the input image 330a can be mapped directly to facial points of the similar face in the frame 335b in order to generate a frame 330b for a lip synching video for the particular user. The facial points of the particular user in the input image 330a can also be mapped directly to facial points of the similar face in the frame 335c in order to generate a frame 330c for the lip synching video for the particular user. In some embodiments, a transformation mapping the facial points of the particular user in the input image 330a to facial points of the similar face in the frame 335a can be determined, and a transformation mapping the facial points of the similar face in the frame 335a to the facial points of the similar face in the frame 335b can be determined. In these embodiments, the determined transformations can be applied to the input image 330a in order to generate the frame 330b. Transformations can be determined and applied to the input image 330a in a similar manner in order to generate the frame 330c. All examples herein are provided for illustrative purposes, and there can be many variations and other possibilities.

Figure 3C:
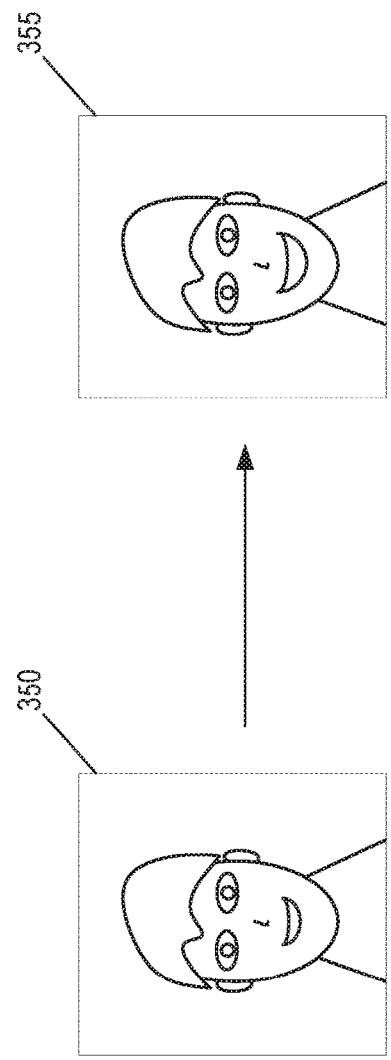
FIG. 3C illustrates an example scenario for providing amplified expressions based on facial recognition, according to an embodiment of the present disclosure.

FIG. 3C illustrates an example scenario 340 for providing amplified expressions based on facial recognition, according to an embodiment of the present disclosure. For example, amplified expressions can be generated by the face recognition effect module 102, as discussed herein. In the example scenario 340, an input image 350 of a particular user depicting a specific expression is obtained. Key points of the specific expression are identified and amplified in order to generate an image 355 depicting the particular user with an amplified version of the expression. In the example scenario 340, the specific expression is a smiling expression, and the smiling expression is amplified in the image 355. All examples herein are provided for illustrative purposes, and there can be many variations and other possibilities.

FIG. 4 illustrates an example first method 400 for providing various media effects based on facial recognition, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can obtain a first image of a first user depicting a face of the first user with a neutral expression or position. At block 404, the example method 400 can identify a first image of a second user depicting a face of the second user with a neutral expression or position, wherein the face of the second user is similar to the face of the first user based on satisfaction of a threshold value. At block 406, the example method 400 can generate a second image of the first user depicting the face of the first user with an expression different from the neutral expression or position, based on a second image of the second user depicting the face of the second user with an expression or position different from the neutral expression or position. Other suitable techniques that incorporate various features and embodiments of the present disclosure are possible.

FIG. 5 illustrates an example second method 500 for providing various media effects based on facial recognition, according to an embodiment of the present disclosure. It should be understood that there can be additional, fewer, or alternative steps performed in similar or alternative orders, or in parallel, based on the various features and embodiments discussed herein unless otherwise stated.

At block 502, the example method 500 can obtain a first image of a user depicting a face of the user with a particular expression. At block 504, the example method 500 can determine key points of the particular expression. At block 506, the example method 500 can amplify the key points of the particular expression. At block 508, the example method 500 can generate a second image of the user depicting the face of the user with an amplified version of the particular expression, based on the amplified key points. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
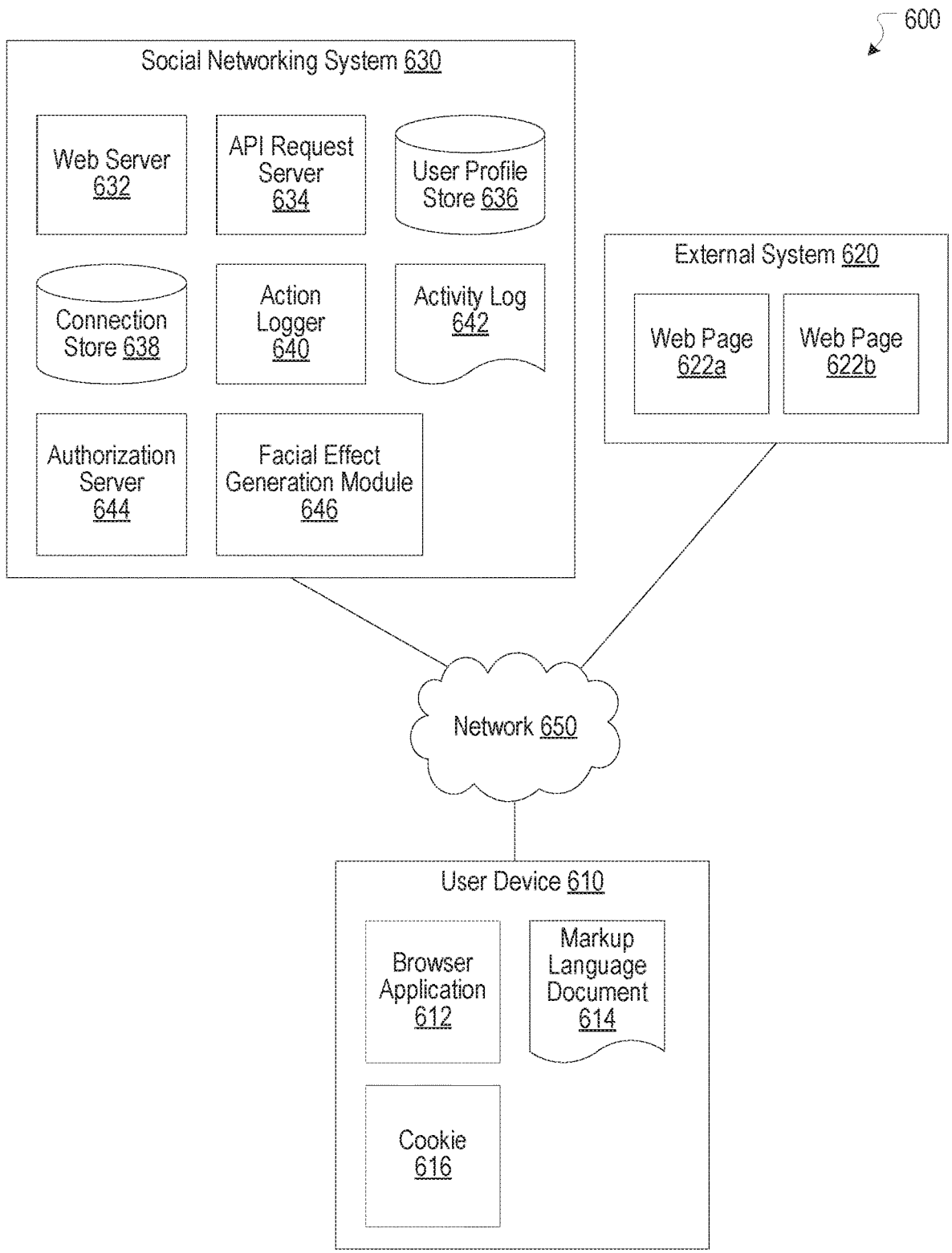
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a facial effect generation module 646. The facial effect generation module 646 can be implemented with the facial effect generation module 102, as discussed in more detail herein. In some embodiments, one or more functionalities of the facial effect generation module 646 can be implemented in the user device 610.

Hardware Implementation

Figure 7:
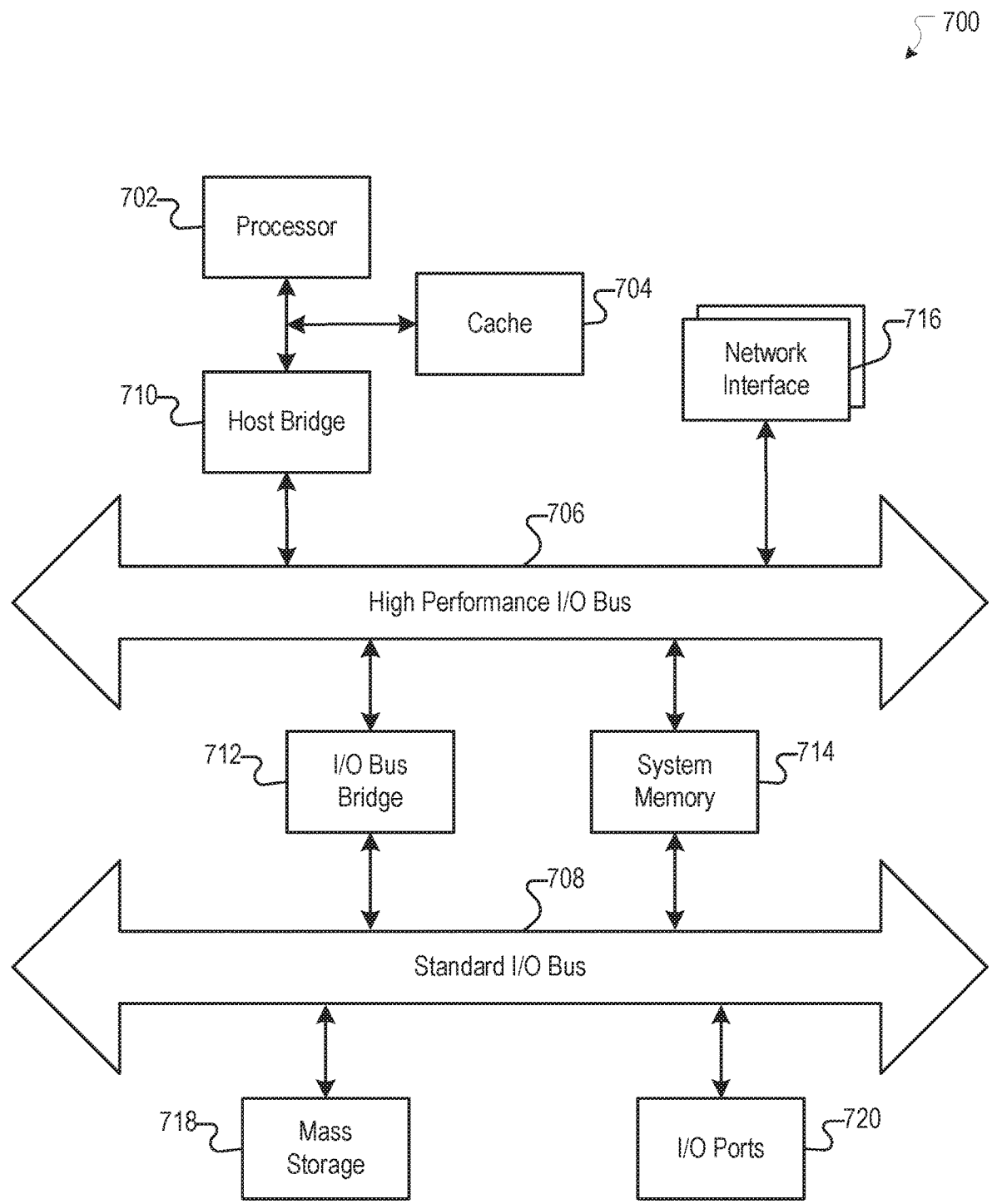
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   obtaining, by a computing system, a first image of a first user depicting a face of the first user with a neutral expression or position;
   identifying, by the computing system, a first image of a second user depicting a face of the second user with a neutral expression or position, wherein the face of the second user is similar to the face of the first user based on satisfaction of a threshold value; and
   generating, by the computing system, a personalized emoticon for the first user based on a second image of the second user, wherein the generating the personalized emoticon for the first user further comprises:
      generating a second image of the first user depicting the face of the first user with an expression different from the neutral expression or position based on the second image of the second user depicting the face of the second user with an expression or position different from the neutral expression or position, and
      generating the personalized emoticon for the first user based on the second image of the first user.

2. The computer-implemented method of claim 1, wherein the identifying the first image of the second user includes comparing facial points of the first user in the first image of the first user and facial points of the second user in the first image of the second user, wherein a degree of a match between the facial points of the first user and the facial points of the second user satisfies the threshold value.

3. The computer-implemented method of claim 1, further comprising generating a personalized emoticon for the first user based on the second image of the first user.

4. The computer-implemented method of claim 1, wherein the first image of the second user is included in a video of the second user singing a song, and wherein the method further comprises generating a lip synching video of the first user based on the second image of the first user.

5. The computer-implemented method of claim 1, wherein the identifying the first image of the second user includes comparing a texture of at least a region in the first image of the first user and a texture of a corresponding region in the first image of the second user, wherein a degree of a match between the texture of the at least a region in the first image of the first user and the texture of the at least a region in the first image of the second user satisfies a threshold value.

6. The computer-implemented method of claim 5, wherein a portion of the at least a region in the first image of the second user is copied to generate the second image of the first user.

7. The computer-implemented method of claim 5, wherein the comparing the texture of the at least a region in the first image of the first user and the texture of the corresponding region in the first image of the second user includes determining texture features of the at least a region in the first image of the first user and texture features of the at least a region in the first image of the second user.

8. The computer-implemented method of claim 7, wherein an image is represented as a matrix of values, and texture features of the image includes one or more of: an average of the values or a median of the values.

9. The computer-implemented method of claim 1, wherein the expression different from the neutral expression includes one or more of: a happy expression, a sad expression, an angry expression, a surprise expression, a crying expression, a smiling expression, a laughing expression, or a frowning expression.

10. A system comprising:
    at least one hardware processor; and
    a memory storing instructions that, when executed by the at least one processor, cause the system to perform:
       obtaining a first image of a first user depicting a face of the first user with a neutral expression or position;
       identifying a first image of a second user depicting a face of the second user with a neutral expression or position, wherein the face of the second user is similar to the face of the first user based on satisfaction of a threshold value; and
       generating a personalized emoticon for the first user based on a second image of the second user, wherein the generating the personalized emoticon for the first user further comprises:
          generating a second image of the first user depicting the face of the first user with an expression different from the neutral expression or position based on the second image of the second user depicting the face of the second user with an expression or position different from the neutral expression or position, and
          generating the personalized emoticon for the first user based on the second image of the first user.

11. The system of claim 10, wherein the identifying the first image of the second user includes comparing facial points of the first user in the first image of the first user and facial points of the second user in the first image of the second user, wherein a degree of a match between the facial points of the first user and the facial points of the second user satisfies the threshold value.

12. The system of claim 10, further comprising generating a personalized emoticon for the first user based on the second image of the first user.

13. The system of claim 10, wherein the first image of the second user is included in a video of the second user singing a song, and wherein the instructions further cause the system to perform generating a lip synching video of the first user based on the second image of the first user.

14. A non-transitory computer readable medium including instructions that, when executed by at least one hardware processor of a computing system, cause the computing system to perform a method comprising:
    obtaining a first image of a first user depicting a face of the first user with a neutral expression or position;
    identifying a first image of a second user depicting a face of the second user with a neutral expression or position, wherein the face of the second user is similar to the face of the first user based on satisfaction of a threshold value; and
    generating a personalized emoticon for the first user based on a second image of the second user, wherein the generating the personalized emoticon for the first user further comprises:
       generating a second image of the first user depicting the face of the first user with an expression different from the neutral expression or position based on the second image of the second user depicting the face of the second user with an expression or position different from the neutral expression or position, and
       generating the personalized emoticon for the first user based on the second image of the first user.

15. The non-transitory computer readable medium of claim 14, wherein the identifying the first image of the second user includes comparing facial points of the first user in the first image of the first user and facial points of the second user in the first image of the second user, wherein a degree of a match between the facial points of the first user and the facial points of the second user satisfies the threshold value.

16. The non-transitory computer readable medium of claim 14, wherein the method further comprises generating a personalized emoticon for the first user based on the second image of the first user.

17. The non-transitory computer readable medium of claim 14, wherein the first image of the second user is included in a video of the second user singing a song, and wherein the method further comprises generating a lip synching video of the first user based on the second image of the first user.

* * * * *